(12) United States Patent
Miyake et al.

(10) Patent No.: US 11,731,643 B2
(45) Date of Patent: Aug. 22, 2023

(54) VEHICLE MANAGEMENT SYSTEM

(71) Applicant: Yazaki Corporation, Tokyo (JP)

(72) Inventors: Hideto Miyake, Shizuoka (JP); Shinichi Okamoto, Shizuoka (JP); Kentaro Otomo, Shizuoka (JP); Daiki Saito, Shizuoka (JP); Koji Ishii, Shizuoka (JP)

(73) Assignee: YAZAKI CORPORATION, Minato-ku (JP)

( * ) Notice: Subject to any disclaimer, the term of this patent is extended or adjusted under 35 U.S.C. 154(b) by 285 days.

(21) Appl. No.: 16/808,511

(22) Filed: Mar. 4, 2020

(65) Prior Publication Data

US 2020/0283010 A1   Sep. 10, 2020

(30) Foreign Application Priority Data

Mar. 7, 2019   (JP) .................. 2019-041168

(51) Int. Cl.
*B60W 50/10*   (2012.01)
*B60W 50/14*   (2020.01)
*G06F 3/01*   (2006.01)
*G06V 20/20*   (2022.01)
*G06V 20/59*   (2022.01)

(52) U.S. Cl.
CPC .......... *B60W 50/10* (2013.01); *B60W 50/14* (2013.01); *G06F 3/017* (2013.01); *G06V 20/20* (2022.01); *G06V 20/59* (2022.01)

(58) Field of Classification Search
CPC ...... B60W 50/10; B60W 50/14; G06V 20/59; G06V 20/20; G06F 3/017
See application file for complete search history.

(56) References Cited

U.S. PATENT DOCUMENTS

| | | | |
|---|---|---|---|
| 6,177,887 B1* | 1/2001 | Jerome | B64D 11/0638 379/49 |
| 2005/0004801 A1* | 1/2005 | Liebermann | G10L 15/26 704/271 |
| 2007/0102972 A1* | 5/2007 | Dinkel | B60R 11/0235 707/E17.119 |
| 2014/0055349 A1 | 2/2014 | Itoh | |
| 2014/0067204 A1 | 3/2014 | Takahashi et al. | |
| 2014/0309862 A1 | 10/2014 | Ricci | |
| 2017/0102783 A1 | 4/2017 | Shikii et al. | |
| 2017/0235371 A1 | 8/2017 | Hsiao et al. | |
| 2017/0316533 A1* | 11/2017 | Goldman-Shenhar | H04L 67/306 |

(Continued)

FOREIGN PATENT DOCUMENTS

| | | |
|---|---|---|
| CA | 3 034 350 A1 | 3/2018 |
| CN | 208314982 U | 1/2019 |

(Continued)

*Primary Examiner* — James T Tsai

(57) ABSTRACT

A vehicle management system includes an imaging device provided in a shared vehicle to capture a plurality of passengers on the vehicle, a detection unit that detects that a user, who is one of the passengers, has performed a predetermined motion which is a motion registered in advance, based on a capturing result by the imaging device, and a controller that controls the vehicle based on a predetermined command, which is a command registered in advance as a command corresponding to the predetermined motion, when the predetermined motion is detected.

4 Claims, 6 Drawing Sheets

(56) References Cited

U.S. PATENT DOCUMENTS

| | | | |
|---|---|---|---|
| 2017/0349184 A1* | 12/2017 | Tzirkel-Hancock | B60W 50/08 |
| 2018/0079427 A1* | 3/2018 | Herz | G05D 1/0088 |
| 2019/0031146 A1* | 1/2019 | Etonye | G07C 9/00174 |
| 2019/0051069 A1* | 2/2019 | Cooley | G10L 17/22 |
| 2019/0144000 A1* | 5/2019 | Hennes | G06Q 50/30 701/23 |
| 2019/0146491 A1* | 5/2019 | Hu | A61B 5/18 701/27 |
| 2019/0219417 A1* | 7/2019 | Quint | G01C 21/3632 |
| 2019/0263422 A1* | 8/2019 | Enthaler | G07C 9/00 |
| 2019/0265703 A1* | 8/2019 | Hicok | G05D 1/0088 |
| 2019/0391581 A1* | 12/2019 | Vardaro | A61B 5/02055 |
| 2020/0005799 A1* | 1/2020 | Boyer | G10L 17/24 |
| 2020/0043344 A1 | 2/2020 | Shimizu et al. | |
| 2021/0179117 A1* | 6/2021 | Glazman | G06V 20/59 |

FOREIGN PATENT DOCUMENTS

| | | |
|---|---|---|
| CN | 109291793 A | 2/2019 |
| JP | 3061315 U | 9/1999 |
| JP | 2005-89095 A | 4/2005 |
| JP | 2015-169980 A | 9/2015 |
| JP | 2017-73107 A | 4/2017 |
| JP | 2018-150672 A | 9/2018 |
| JP | 2018-179547 A | 11/2018 |
| WO | 2018/037954 A1 | 3/2018 |

* cited by examiner

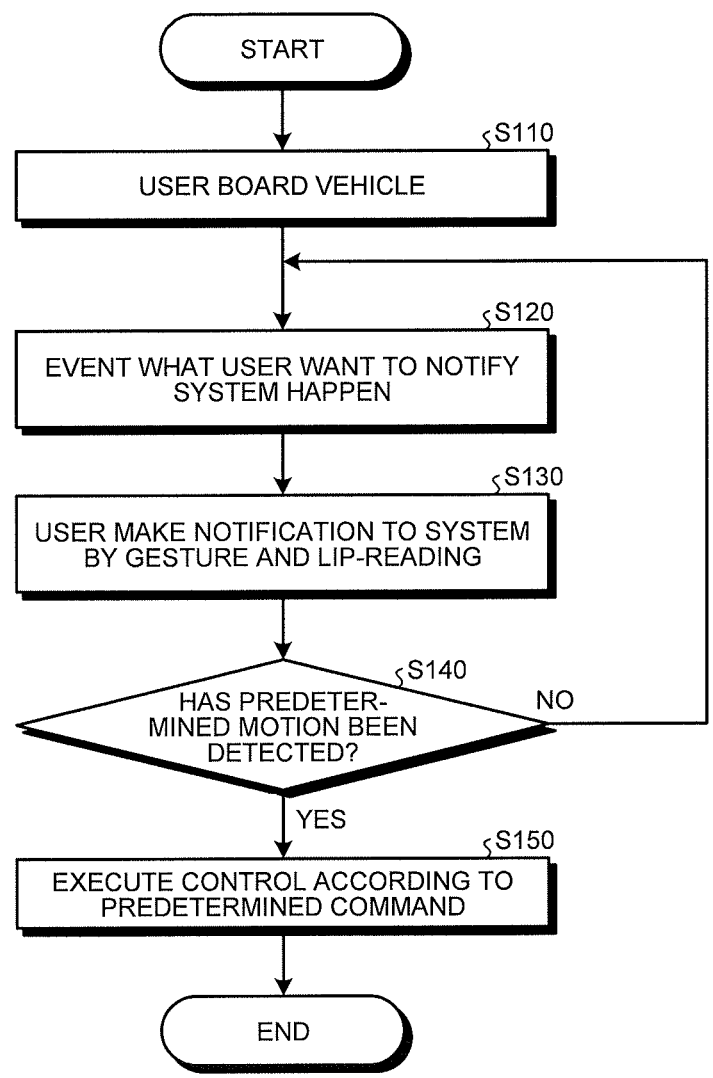

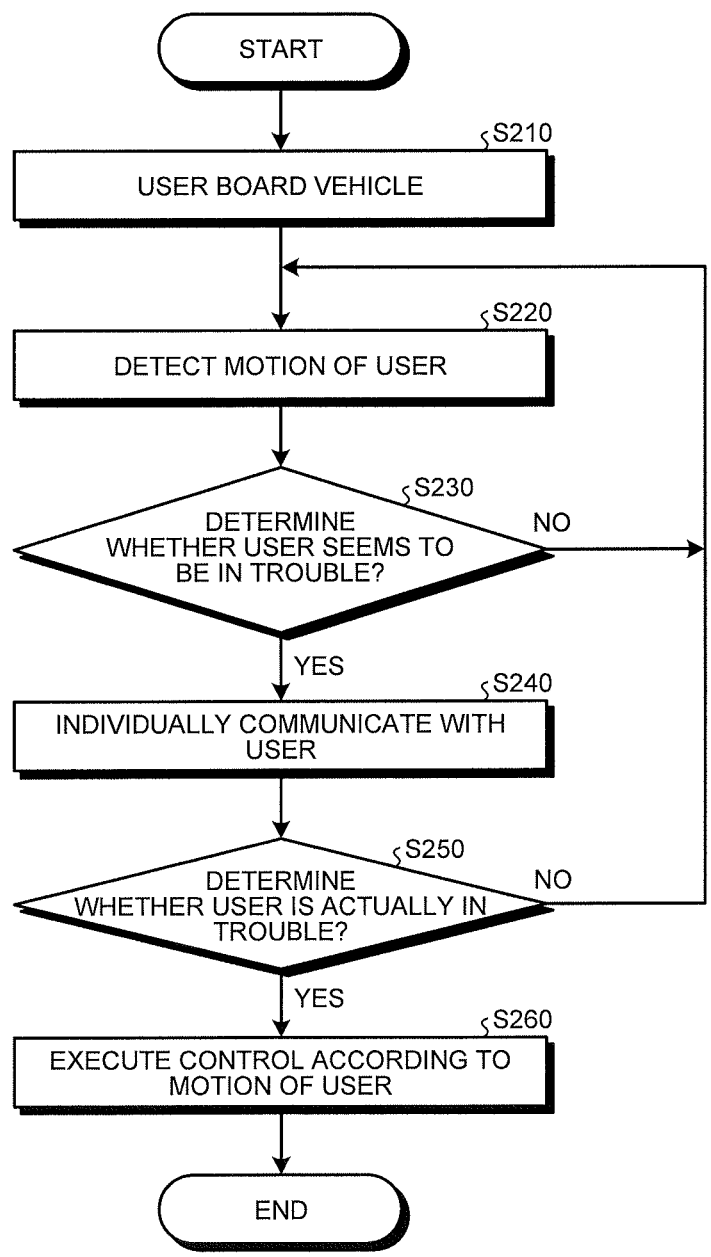

VEHICLE MANAGEMENT SYSTEM

CROSS-REFERENCE TO RELATED APPLICATION(S)

The present application claims priority to and incorporates by reference the entire contents of Japanese Patent Application No. 2019-041168 filed in Japan on Mar. 7, 2019.

BACKGROUND OF THE INVENTION

1. Field of the Invention

The present invention relates to a vehicle management system.

2. Description of the Related Art

In the related art, there is a technology of estimating an emotion of a user. Japanese Patent Application Laid-open No. 2017-73107 discloses a technology of estimating an emotion of a user in a vehicle. In a case where a vehicle is a taxi, an information presentation device of Japanese Patent Application Laid-open No. 2017-73107 estimates an emotion of a passenger, and performs control such as setting a speed limit, increasing the weight of an accelerator, or switching to automatic driving without making a notification to a driver when the passenger feels fear.

In a shared vehicle in which a plurality of passengers ride, it is desired to be able to appropriately grasp demands of the passengers. The passengers may desire to send their demands to the vehicle without being noticed by the other passengers. For example, in a case where it is desired to cause the vehicle to give a warning to a passenger doing an annoying behavior, if it is possible to send such a demand to the vehicle without being noticed by the other passengers, the convenience of the shared vehicle is improved.

SUMMARY OF THE INVENTION

An object of the present invention is to provide a vehicle management system in which a passenger can send a demand to a vehicle without being noticed by the other passengers.

In order to achieve the above mentioned object, a vehicle management system according to one aspect of the present invention includes an imaging device provided in a shared vehicle and configured to capture a plurality of passengers on the vehicle; a detection unit configured to detect that a user, who is one of the passengers, has performed a predetermined motion which is a motion registered in advance, based on a capturing result by the imaging device; and a controller configured to control the vehicle based on a predetermined command, which is a command registered in advance as a command corresponding to the predetermined motion, when the predetermined motion is detected.

According to another aspect of the present invention, in the vehicle management system, it is preferable that the predetermined command is a command for causing the vehicle to give a warning to the passenger doing an annoying behavior.

According to still another aspect of the present invention, in the vehicle management system, it is preferable that the predetermined command is a command for changing a drop-off point of the user.

According to still another aspect of the present invention, in the vehicle management system, it is preferable that the predetermined command is a command for changing the drop-off point to a point close to a nearest restroom.

According to still another aspect of the present invention, in the vehicle management system, it is preferable that the controller is configured to inquire of the passenger, when the passenger performs a typical motion of a person in trouble, whether the passenger is actually in trouble by individual communication, and the controller controls the vehicle based on a response motion performed by the passenger in response to the inquiry from the controller.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a flowchart according to vehicle control in the embodiment; and

FIG. 7 is a flowchart according to another vehicle control in the embodiment.

DETAILED DESCRIPTION OF THE PREFERRED EMBODIMENTS

Hereinafter, a vehicle management system according to an embodiment of the present invention will be described in detail with reference to the drawings. It is noted that the invention is not limited by this embodiment. Furthermore, components in the following embodiment include those that can be easily conceived of by a person skilled in the art or those that are substantially the same.

Embodiment

Figure 1:
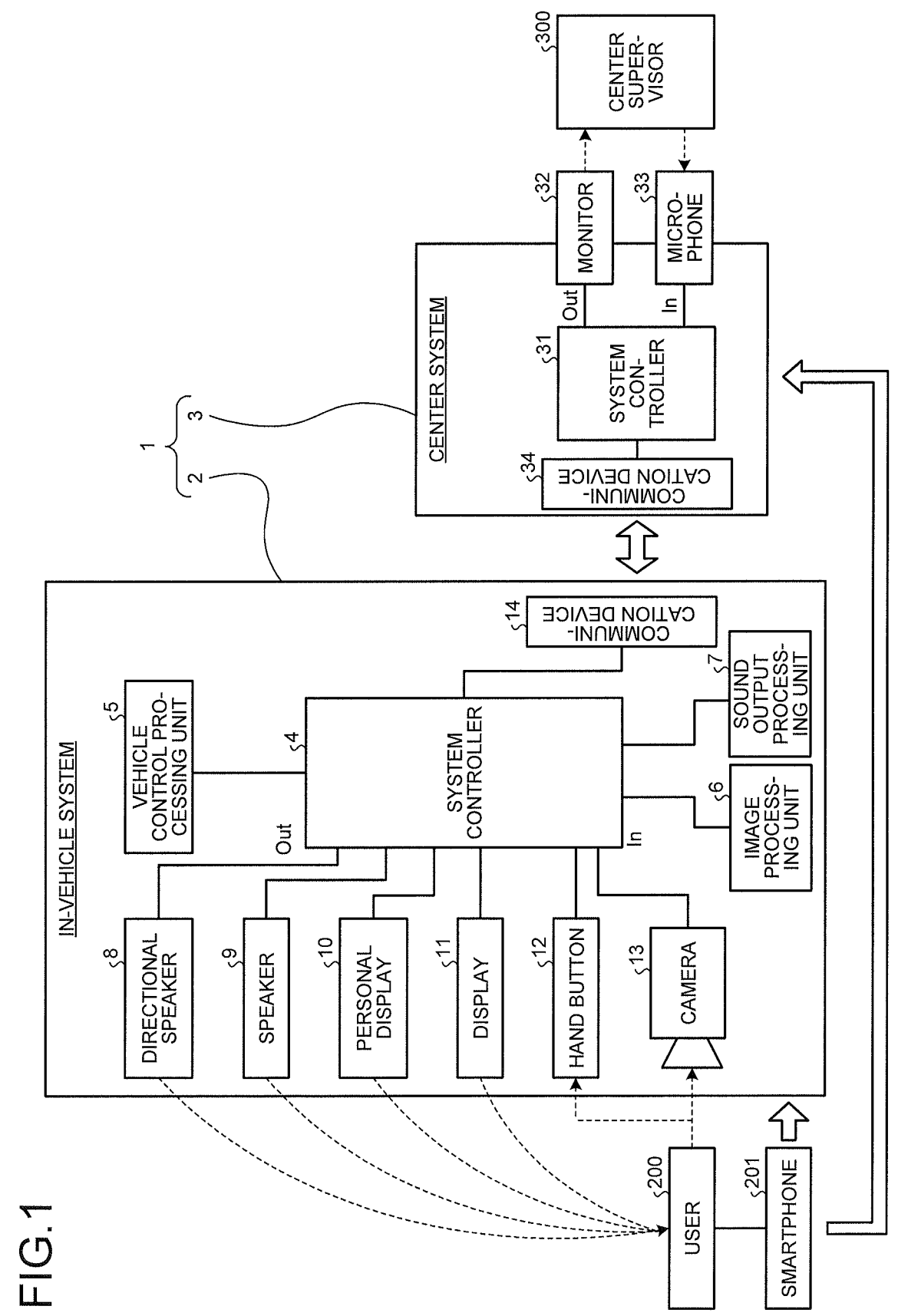
FIG. 1 is a block diagram of a vehicle management system according to an embodiment.
Figure 2:
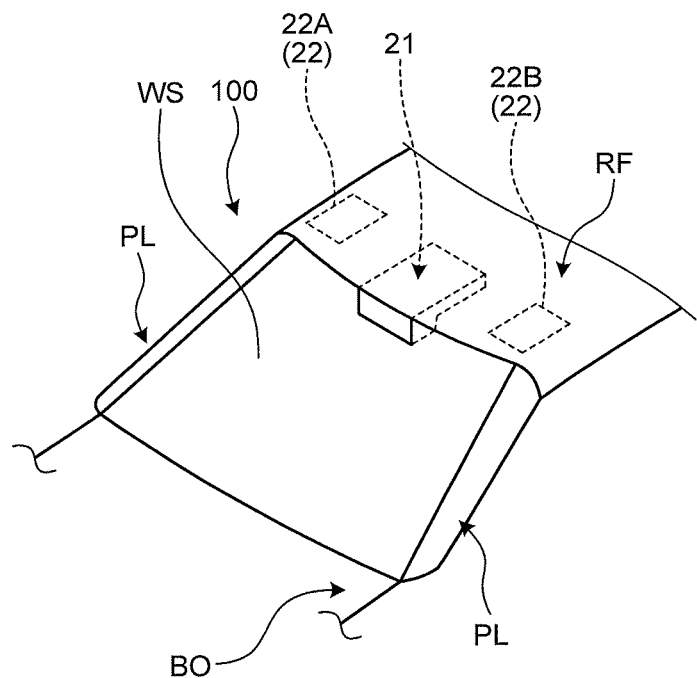
FIG. 2 is a perspective view of main parts of a vehicle according to the embodiment.
Figure 3:
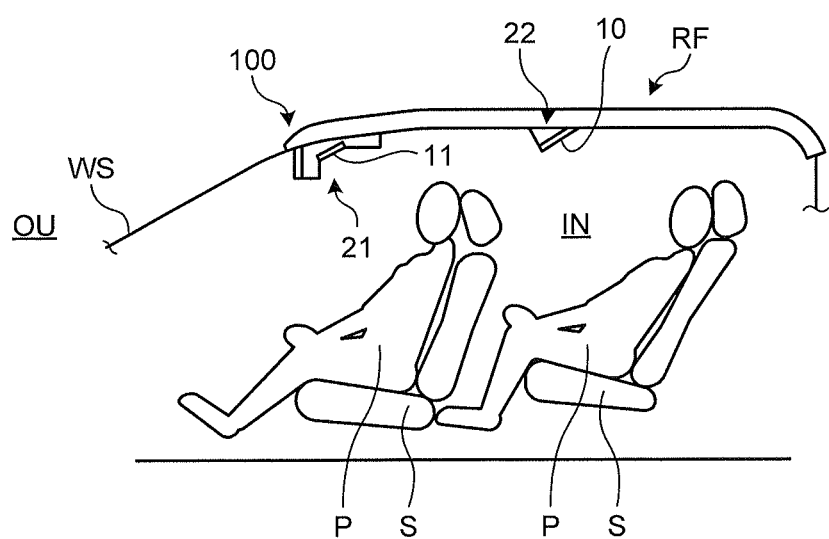
FIG. 3 is a sectional view of the vehicle according to the embodiment.
Figure 4:
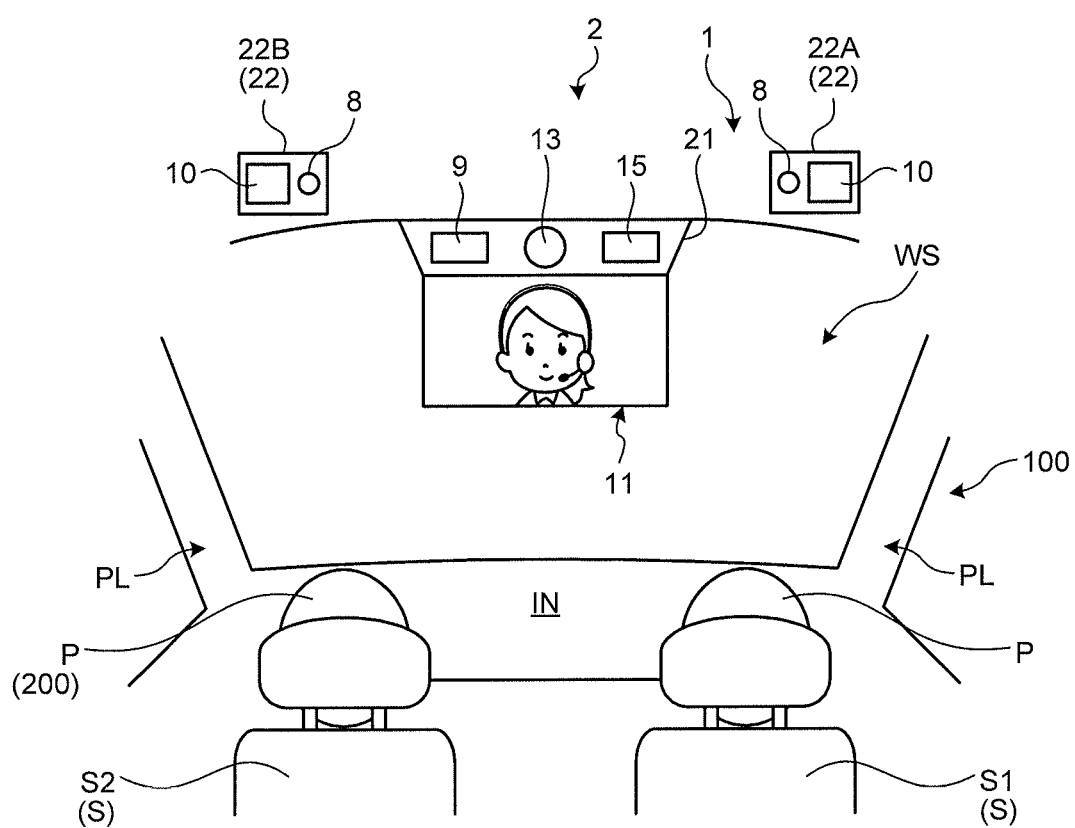
FIG. 4 is a layout diagram of an in-vehicle system according to the embodiment.
Figure 5:
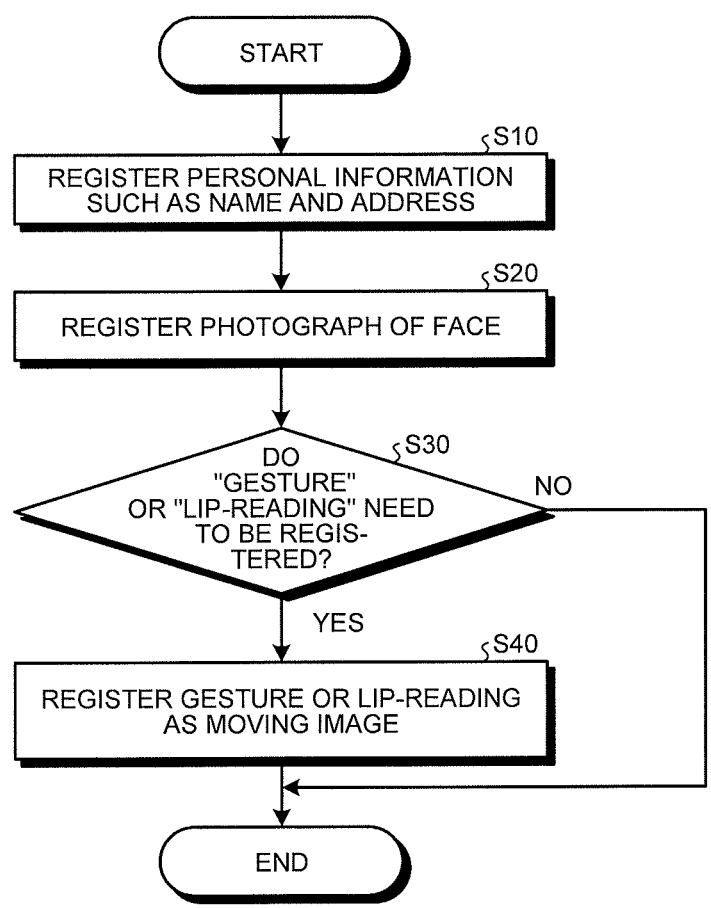
FIG. 5 is a flowchart according to registration of a predetermined motion in the embodiment.

With reference to FIG. 1 to FIG. 7, an embodiment will be described. The present embodiment relates to a vehicle management system. FIG. 1 is a block diagram of the vehicle management system according to the embodiment, FIG. 2 is a perspective view of main parts of a vehicle according to the embodiment, FIG. 3 is a sectional view of the vehicle according to the embodiment, FIG. 4 is a layout diagram of an in-vehicle system according to the embodiment, FIG. 5 is a flowchart according to registration of a predetermined motion in the embodiment, FIG. 6 is a flowchart according to vehicle control in the embodiment, and FIG. 7 is a flowchart according to another vehicle control in the embodiment.

As illustrated in FIG. 1, a vehicle management system 1 according to the embodiment includes an in-vehicle system 2 and a center system 3. The in-vehicle system 2 is a system disposed in a vehicle 100. The vehicle 100 according to the embodiment is a shared vehicle (ride-sharing vehicle) and is a vehicle that travels with a plurality of passengers who want to ride together. The vehicle 100 takes each passenger to a desired drop-off point. The vehicle 100 may cause each passenger to get on at a boarding point designated by the passenger or a predetermined boarding point.

The vehicle 100 according to the present embodiment is an automatic traveling vehicle that automatically travels. That is, the vehicle 100 can travel with only passengers on board without a driver.

As illustrated in FIG. 3 and FIG. 4, the vehicle 100 includes a plurality of seats S. The seats S are arranged along a vehicle front-and-rear direction and a vehicle width direction. As illustrated in FIG. 4, the seats S disposed at a front portion of the vehicle 100 include a first seat S1 and a second seat S2. The first seat S1 is a seat S disposed at a right front portion in a vehicle cabin IN. The second seat S2 is a seat S disposed at a left front portion in the vehicle cabin IN. The passenger sits on any one of the seats S. In the following description, a passenger seated on the seat S is referred to as a "passenger P". Furthermore, a passenger seated on the first seat S1 is referred to as a "first passenger P1" and a passenger seated on the second seat S2 is referred to as a "second passenger P2".

As illustrated in FIG. 1, the in-vehicle system 2 includes a system controller 4, a vehicle control processing unit 5, an image processing unit 6, a sound output processing unit 7, a directional speaker 8, a speaker 9, a personal display 10, a display 11, a hand button 12, a camera 13, and a communication device 14.

The system controller 4 integrally controls the vehicle 100. The system controller 4, for example, is an electronic control device. The system controller 4 includes a calculation unit, a storage unit, an interface and the like. The system controller 4 is communicably connected to each unit constituting the in-vehicle system 2.

The vehicle control processing unit 5 controls various operations of the vehicle 100. The vehicle control processing unit 5, for example, executes travel control of the vehicle 100, and control for opening and closing the doors of the vehicle 100. On the basis of commands from the system controller 4, the vehicle control processing unit 5 controls various actuators provided in the vehicle 100. The actuators provided in the vehicle 100 include a travel driving actuator, a braking actuator, a steering actuator, a door opening/closing actuator, and the like. The vehicle control processing unit 5 can automatically drive the vehicle 100. The vehicle control processing unit 5 acquires information from various sensors and navigation devices disposed in the vehicle 100, controls the actuators on the basis of the acquired information, and automatically drives the vehicle 100.

The image processing unit 6 executes image processing on images captured by the camera 13. More specifically, on the basis of the images captured by the camera 13, the image processing unit 6 detects motions of a plurality of passengers P on the vehicle 100. The motions of the passengers P include the postures of the passengers P, face directions, line-of-sight directions, and the like. Information on the detection results of the image processing unit 6 are transmitted to the system controller 4.

The sound output processing unit 7 processes sound output in the vehicle 100. For example, on the basis of sound data stored in advance, the sound output processing unit 7 generates a sound signal that is output from the directional speaker 8 or the speaker 9. Information on the processing result by the sound output processing unit 7 is transmitted to the system controller 4.

The directional speaker 8 and the personal display 10 are provided for each passenger P of the vehicle 100. The speaker 9 and the display 11 are common communication devices each provided for the passengers P. As illustrated in FIG. 2 to FIG. 4, in the vehicle 100, a first module 21 and a second module 22 are disposed. The first module 21 is a common module each provided for the passengers P. The first module 21 of the present embodiment is common to all the passengers P and only one first module 21 is provided in the vehicle 100. The second module 22 is a personal module each provided for each passenger P. That is, the same number of second modules 22 as the number of seats S disposed in the vehicle 100 are disposed.

The first module 21 and the second module 22 are disposed on a roof member (roof) RF of the vehicle 100. The roof member RF is supported by a body BO of the vehicle 100 via a pillar PL. The first module 21 and the second module 22 are fixed to the vehicle cabin side in the roof member RF. The first module 21 is disposed at the front center in the roof member RF. The second module 22 is disposed corresponding to each seat S. The second module 22 includes a right front module 22A and a left front module 22B.

The right front module 22A is the second module 22 corresponding to the first seat S1 among the second modules 22 of the vehicle 100. The right front module 22A is disposed on the front right side in the roof member RF. The left front module 22B is the second module 22 corresponding to the second seat S2. The left front module 22B is disposed on the front left side in the roof member RF.

As illustrated in FIG. 4, the first module 21 includes the speaker 9, the display 11, the camera 13, and a microphone 15. The speaker 9 outputs sound toward all the passengers P of the vehicle 100. The display 11 is disposed toward the rear of the vehicle. The display 11 displays an image toward all the passengers P. The display 11 is disposed in a position visually recognizable from all the passengers P, for example.

The camera 13 is an imaging device that captures the vehicle cabin IN. The camera 13 is disposed above the display 11 in the first module 21. The camera 13 is disposed toward the rear of the vehicle and captures the rear of the camera 13 in the vehicle cabin IN. The camera 13 is configured to be able to capture all the passengers P, for example. For example, the arrangement and angle of view of the camera 13 are set to be able to capture faces and upper bodies of all the passengers P. The camera 13 may perform imaging in accordance with an imaging command from the system controller 4, or perform imaging automatically and continuously. The camera 13 of the present embodiment is a video camera, for example, and captures a moving image in the vehicle cabin IN.

The microphone 15 is a microphone that collects sound in the vehicle cabin IN. The microphone 15 is configured to be able to detect sound of all the passengers P, for example. The microphone 15 is disposed toward the rear of the vehicle.

The second module 22 includes the directional speaker 8 and the personal display 10. The directional speaker 8 is a speaker that outputs directional sound. For example, the directional speaker 8 of the right front module 22A is configured to output directional sound targeted at the first passenger P1. That is, the directional speaker 8 of the right front module 22A outputs directional sound such that the passengers P, except for the first passenger P1, are not able to hear the sound. Similarly, the directional speaker 8 of the left front module 22B is configured to output directional sound targeted at the second passenger P2. The directional speaker 8 may be disposed on a headrest or the like of each seat S, instead of being disposed on the second module 22.

The personal display 10 is a personal display device disposed for each passenger P. For example, the personal display 10 of the right front module 22A is a dedicated display for the first passenger P1. The personal display 10 may be configured such that no image is visible from the passengers P except for a target passenger P. For example, the personal display 10 of the right front module 22A may output directional display light such that no image is visible from the passengers P except for the first passenger P1.

The hand button 12 is a button disposed close at hand of each passenger P. The hand button 12, for example, may be provided in each seat S, or may be disposed in the vicinity of each seat S in the body BO. The passenger P can issue commands and requests to the in-vehicle system 2 with the hand button 12.

The communication device 14 is a wireless communication device that transmits and receives radio waves to/from the center system 3. The communication device 14 may communicate directly with a communication device 34 of the center system 3, or may communicate with the communication device 34 via a relay by a base station or a relay by another vehicle 100. Communication between the communication device 14 of the in-vehicle system 2 and the communication device 34 of the center system 3 may include wired communication.

The center system 3 includes a system controller 31, a monitor 32, a microphone 33, and the communication device 34. The center system 3 is a system that manages a plurality of vehicles 100. The center system 3 acquires information on current positions of the vehicle 100, the presence or absence of the passenger P, and the like from each vehicle 100 by communication. The center system 3 can acquire image data captured by the camera 13 from each vehicle 100, and monitor the state of the vehicle cabin IN of the vehicle 100. Furthermore, the center system 3 transmits information on passengers scheduled to board to each vehicle 100 by communication. The center system 3 may have a camera that captures a center supervisor 300 to be described below.

The monitor 32 displays information for monitoring the vehicle 100. The monitor 32 displays an image captured by the camera 13, for example. The monitor 32 can display information on the vehicles 100, or can display information on a specific vehicle 100. The vehicle 100 is monitored by the center supervisor 300. The microphone 33 picks up sound of the center supervisor 300. The microphone 33 may be provided in a headset worn by the center supervisor 300. The center supervisor 300 can converse with the passenger P of the vehicle 100 via the headset, for example.

The center supervisor 300 monitors each vehicle 100 by operating the center system 3. For example, when a response request is made from the vehicle 100, the center supervisor 300 responds to the passenger P of the relevant vehicle 100. Furthermore, when abnormality and the like are detected in the vehicle 100, the center supervisor 300 monitors the vehicle 100. Furthermore, when the vehicle 100 detects a state in which the passenger P is in trouble, the center supervisor 300 may send an individual message to the passenger P.

With reference to FIG. 5 and FIG. 6, an operation of the vehicle management system 1 according to the present embodiment will be described. FIG. 5 illustrates a procedure in which a user 200 using the vehicle 100 registers a cue. The user 200 using the vehicle 100 of the present embodiment can issue a request or command to the vehicle management system 1 by a cue other than sound. The user 200 can register a motion (cue) corresponding to the request or command with the vehicle management system 1 in advance.

In the following description, the motion registered in advance by the user 200 is referred to as a "predetermined motion". The predetermined motion is associated with a command for the vehicle management system 1. The user 200 registers a command for the vehicle 100 by the predetermined motion with the vehicle management system 1 in advance. In the following description, a command, which is registered by the user 200 and registered in advance as a command corresponding to the predetermined motion, is referred to as a "predetermined command".

The user 200 registers the predetermined motion and the predetermined command by using a smartphone 201, for example. As illustrated in FIG. 1, the in-vehicle system 2 and the center system 3 of the embodiment can communicate with the smartphone 201. Communication between the in-vehicle system 2 and the smartphone 201 is performed by short-range wireless communication, for example. Communication between the center system 3 and the smartphone 201 is performed using a communication line of a communication company, for example.

In the vehicle management system 1 of the present embodiment, the center system 3 accepts the registration of the predetermined motion and the predetermined command. The registration work is made by an application of the smartphone 201, for example. With the application, personal information such as the name and address of the user 200 is registered as illustrated at step S10 of FIG. 5. The personal information input with the application is transmitted to the center system 3. The center system 3 assigns a user ID to the user 200 and stores therein the personal information in association with the user ID.

Next, as illustrated at step S20, a photograph of the face of the user 200 is registered. The user 200 captures his/her face with a camera of the smartphone 201 and generates facial image data. The user 200 designates facial image data to be transmitted with the application. In such a case, a plurality of pieces of facial image data captured in different directions may be transmitted. For example, in addition to an image obtained by capturing the face of the user 200 from the front, an image obtained by capturing the face from an oblique direction may be transmitted. The designated facial image data is transmitted from the smartphone 201 to the center system 3. The center system 3 stores therein the facial image data in association with the user ID. The in-vehicle system 2 identifies the user 200 on the basis of the facial image data.

Next, at step S30, it is confirmed whether to register gestures or data for lip-reading. In the present embodiment, gestures or mouth motions can be registered as the predetermined motion. That is, at step S30, it is confirmed whether to register the predetermined motion. When the user 200 designates that the predetermined motion is registered at step S30 (Yes at S30), the present control flow proceeds to step S40, and when the user 200 designates that the predetermined motion is not registered at step S30 (No at S30), the present control flow ends.

At step S40, the user 200 registers the predetermined motion. The user 200 captures a moving image of the predetermined motion with the smartphone 201. In such a case, the user 200 performs the predetermined motion and captures a moving image of the user 200 who is performing the motion. The user 200 designates moving image data to be transmitted with the application. One piece of the moving image data corresponds to one predetermined motion, for example. In such a case, when registering a plurality of predetermined motions, a plurality of pieces of moving image data is transmitted. Furthermore, the user 200 designates a command corresponding to the predetermined motion. A command that can be associated with the predetermined motion is prepared in advance by the vehicle management system 1, for example.

A selectable command, for example, includes a command for causing the vehicle 100 to give a warning to another passenger P doing an annoying behavior. In the following description, the command for causing the vehicle 100 to give a warning to another passenger P doing an annoying behavior is referred to as a "first predetermined command". Furthermore, a predetermined motion for executing the first predetermined command is referred to as a "first predetermined motion".

The selectable command may include a command for changing a drop-off point of the user 200. The command for changing the drop-off point, for example, may be a command for changing the drop-off point to a point close to the nearest restroom. In the following description, the command for changing the drop-off point is referred to as a "second predetermined command". Furthermore, a predetermined motion for executing the second predetermined command is referred to as a "second predetermined motion".

The selectable command may include a command for quickly stopping the vehicle 100. The command for quickly stopping the vehicle 100 is referred to as a "third predetermined command". Furthermore, a predetermined motion for executing the third predetermined command is referred to as a "third predetermined motion".

The selectable command may include a command to be notified to the center supervisor 300. This notification, for example, may include a notification requesting individual communication with the user 200, or a notification for notifying that a troubled situation has occurred in the vehicle cabin IN. The command to be notified to the center supervisor 300 from the vehicle 100 is referred to as a "fourth predetermined command". Furthermore, a predetermined motion for executing the fourth predetermined command is referred to as a "fourth predetermined motion".

The user 200 designates a combination of the moving image data of the predetermined motion and the predetermined command corresponding to the predetermined motion, with the application. The moving image data and the corresponding predetermined command are transmitted to the center system 3. The center system 3 stores therein the combination of the moving image data of the predetermined motion and the predetermined command corresponding to the predetermined motion in association with the user ID. For example, the center system 3 stores therein the first predetermined motion and the first predetermined command in association with each other, and stores therein the second predetermined motion and the second predetermined command in association with each other. After step S40 is completed, the present control flow ends.

In the case of using the vehicle 100, the user 200 makes a use reservation with the center system 3. The use reservation is made by the application of the smartphone 201, for example. The user 200 registers reservation information on a use date, a place to board, a time to board, a place to get off, and a time to get off with the center system 3. The center system 3 stores therein the reservation information in association with the user ID. On the basis of the reservation information, the center system 3 dispatches the vehicle 100. The center system 3 transmits the user ID of the user 200, the reservation information, information on the predetermined motion, and the predetermined command to the vehicle 100 assigned to the user 200. The information on the predetermined motion may be the moving image data itself registered by the user 200, or information extracted from the moving image data, that is, information for detecting the predetermined motion from an image.

The vehicle 100 stops at a designated place to board at the time to board designated by the reservation information. User authentication is performed when the user 200 boards the vehicle 100. The user authentication is made by the application of the smartphone 201, for example. For example, the user ID and the reservation information are transmitted from the smartphone 201 to the in-vehicle system 2. On the basis of the received information, the in-vehicle system 2 confirms that the reserved user 200 has boarded. The transmission of the predetermined motion and the predetermined command from the center system 3 to the in-vehicle system 2 may be executed simultaneously with the transmission of the reservation information, or may be executed after the boarding of the user 200 is confirmed. Alternatively, the predetermined motion and the predetermined command may be transmitted from the smartphone 201 to the in-vehicle system 2 when the user authentication is executed.

When the user 200 sits on the seat S, the seating position is confirmed. The seating position is confirmed on the basis of an image processing result by the image processing unit 6, for example. The system controller 4, for example, delivers the facial image data of the user 200 to the image processing unit 6. On the basis of an image captured by the camera 13, the image processing unit 6 determines a seat S on which the user 200 is sitting. On the basis of the determination result, the image processing unit 6 sends the position of the seat S on which the user 200 is sitting to the system controller 4.

With reference to FIG. 6, an operation of the vehicle management system 1 when the user 200 uses the vehicle 100 will be described. At step S110 of FIG. 6, the user 200 boards the vehicle 100. The vehicle 100 executes user authentication as described above and specifies the seat S on which the user 200 is sitting. In the following description, it is assumed that the user 200 is sitting on the left front seat S2. That is, the user 200 boards the vehicle 100 as the second passenger P2.

Next, at step S120, an event what the user 200 want to notify the vehicle management system 1 happens. For example, it is assumed that the user 200 feels inconvenience due to the first passenger P1 talking loudly on the first seat S1. In such a case, the user 200 wants the vehicle 100 to give a warning to the first passenger P1. However, it is desired that the first passenger P1 does not know that the person who causes the warning is the user 200. The vehicle management system 1 of the present embodiment can issue a command to the vehicle 100 without being noticed by the other passengers P, as described below.

At step S130, the user 200 performs the predetermined motion registered in advance. The predetermined motion performed here is the first predetermined motion. The first predetermined motion, for example, may be a gesture, a mouth motion, keeping a mouth in a specific shape, or other motions.

At step S140, the in-vehicle system 2 determines whether the predetermined motion has been detected. When the user 200 boards the vehicle 100, the system controller 4 sends information on the predetermined motion of the user 200 to the image processing unit 6. On the basis of image data captured by the camera 13, the image processing unit 6 determines whether the predetermined motion of the user 200 has been detected. When the predetermined motion of the user 200 is detected, the image processing unit 6 sends the detected predetermined motion to the system controller 4. For example, when the first predetermined motion by the user 200 is detected, the image processing unit 6 notifies the system controller 4 that the first predetermined motion has been detected. When positive determination is made at step S140 that the predetermined motion has been detected (Yes at S140), the present control flow proceeds to step S150, and when negative determination is made (No at S140), the present control flow proceeds to step S120.

At step S150, the system controller 4 performs control according to the first predetermined command. The system controller 4 causes the sound output processing unit 7 to prepare sound data for warning an annoying behavior. The prepared message is a sound message such as "Please stop a behavior that is disturbing the other passengers", for example. The system controller 4 causes the directional speaker 8 or the speaker 9 to output such a sound message. When the passenger P performing the annoying behavior is specified, a message may be output by the directional speaker 8. For example, when it can be determined that the first passenger P1 is performing the annoying behavior, a message may be output by the directional speaker 8 of the right front module 22A.

The system controller 4 may cause the personal display 10 or the display 11 to display a character or an image for warning the annoying behavior. When the passenger P performing the annoying behavior is specified, a message may be displayed on the personal display 10. For example, when it can be determined that the first passenger P1 is performing the annoying behavior, a message may be displayed on the personal display 10 of the right front module 22A. After the execution of step S150, the present control flow ends.

The vehicle management system 1 of the present embodiment can automatically detect that the passenger P is in trouble even when the predetermined motion is not detected. With reference to FIG. 7, an operation of automatically detecting that the passenger P is in trouble will be described. At step S210 of FIG. 7, the user 200 boards the vehicle 100. The vehicle 100 executes user authentication and specifies a seat S on which the user 200 is sitting. The user 200 may have registered the predetermined motion or may have registered no predetermined motion. The user 200 sits on the second seat S2, for example. After the execution of step S210, the present control flow proceeds to step S220.

At step S220, a motion of the user 200 is detected by the image processing unit 6. The image processing unit 6 also detects motions of the passengers P other than the user 200. After the execution of step S220, the present control flow proceeds to step S230.

At step S230, it is determined whether the user 200 seems to be in trouble. The image processing unit 6 calculates the degree of similarity between the motion detected at step S220 and a sample motion stored in advance. The sample motion is a motion registered as a typical motion that is performed by the passenger P in trouble. The sample motion, for example, includes a motion of turning the face away from another passenger P doing an annoying behavior, a motion of frowning the face, or a motion of feeling impatient without calmness. The sample motion may be a motion in which the posture of the passenger P changes from a relaxed posture to a tensed posture.

The image processing unit 6 calculates the degree of similarity between the motion of the user 200 detected at step S220 and the sample motion. When the degree of similarity is high, the image processing unit 6 determines that the user 200 has performed the same motion as the sample motion. The image processing unit 6 transmits the determination result to the system controller 4. When the determination result that the user 200 has performed the same motion as the sample motion is received from the image processing unit 6, the system controller 4 determines that the user 200 seems to be in trouble. When positive determination is made at step S230 that the user 200 seems to be in trouble (Yes at S230), the present control flow proceeds to step S240, and when negative determination is made (No at S230), the present control flow proceeds to step S220.

At step S240, the system controller 4 executes individual communication with the user 200. The individual communication is secret communication that is made unknown to the other passengers P than the user 200. For example, the system controller 4 outputs a sound message to the user 200 through the directional speaker 8. In such a case, the sound message, for example, is a message "When in trouble, please tell that by a gesture or a mouth motion".

When the predetermined motion has been registered in advance, the user 200 can issue a command to the vehicle 100 by performing the predetermined motion. When the predetermined motion is not detected well or the predetermined motion has not been registered, the user 200 may perform a motion presented from the vehicle management system 1. The system controller 4 notifies the user 200 of a motion for sending the troubled content by the individual communication. For example, the system controller 4 outputs a sound message "When feeling annoying other passengers, please look at the camera 13 for 10 seconds" from the directional speaker 8. When the system controller 4 makes an inquiry to the user 200, the present control flow proceeds to step S250.

At step S250, the system controller 4 determines whether the user 200 is actually in trouble. Based on a motion of the user 200 after the user 200 is inquired, the system controller 4 determines whether the user 200 is actually in trouble. A motion performed in response to the inquiry to the user 200 is referred to as a "response motion". For example, when the user 200 continuously looks at the camera 13 for 10 seconds in response to the inquiry, the system controller 4 determines that the user 200 is actually in trouble. On the other hand, when the user 200 does not perform the motion of continuously looking at the camera 13, the system controller 4 determines that the user 200 is not in trouble. When positive determination is made at step S250 that the user 200 is in trouble (Yes at S250), the present control flow proceeds to step S260, and when negative determination is made (No at S250), the present control flow proceeds to step S220.

At step S260, the system controller 4 executes control according to the response motion of the user 200. The system controller 4 gives a warning to the passenger P doing an annoying behavior in accordance with the response motion in which the user 200 looks at the camera 13 for 10 seconds. The system controller 4, for example, outputs a sound message "Please stop a behavior that is disturbing the other passengers" from the speaker 9 or the directional speaker 8. After the execution of step S260, the present control flow ends.

In the individual communication with the user 200, the system controller 4 may display the inquiry to the user 200 on the personal display 10. When the personal display 10 outputs highly directional display light, it is possible to make an inquiry to the user 200 without being noticed by the other passengers P.

The response motion performed by the user 200 in response to the inquiry from the system controller 4 is not limited to the motion of looking at the camera 13. The response motion performed by the user 200 may be a motion of pressing the hand button 12, for example. For example, it is possible to notify a troubled content or a command to the vehicle 100 depending on the number of times the hand button 12 is pressed. Depending on the number of times the hand button 12 is pressed, it is possible to send messages such as "Being in trouble because other passengers are noisy", "Want to go restroom", "Want to notify the center supervisor 300 of a certain message", and "Want to stop the vehicle 100 quickly".

The inquiry to the user 200 may be made by the center supervisor 300. In such a case, the center supervisor 300 notifies the user 200 to perform the response motion when the user 200 is in trouble. When the user 200 performs the response motion in response to the inquiry, the center supervisor 300 issues a command to the in-vehicle system 2. For example, when the user 200 performs the response motion indicating that the user 200 is in trouble due to an annoying behavior, the center supervisor 300 issues a command to the in-vehicle system 2 to give a warning against the annoying behavior.

As described above, the vehicle management system 1 according to the present embodiment includes the camera 13, the image processing unit 6, and the system controller 4. The camera 13 is an imaging device provided in the vehicle 100 as a shared vehicle. The camera 13 captures the passengers P on the vehicle 100. The image processing unit 6 serves as a detection unit that detects the user 200, who is one of the passengers P, has performed the predetermined motion. The image processing unit 6 detects the predetermined motion based on the capturing result by the camera 13. The predetermined motion is a motion registered in advance by the user 200.

The system controller 4 is a controller that controls the vehicle 100 based on the predetermined command when the predetermined motion has been detected. The predetermined command is a command registered in advance as a command corresponding to the predetermined motion. In accordance with the vehicle management system 1 according to the present embodiment, the user 200 can issue a command to the vehicle 100 without being noticed by the other passengers P.

Modified Example of Embodiment

The user 200 can issue various commands to the vehicle 100 by using the smartphone 201. For example, the first predetermined command to the fourth predetermined command may be transmitted to the in-vehicle system 2 by the smartphone 201. The user 200 may send a demand to the in-vehicle system 2 by a combination of communication by the smartphone 201 and the predetermined motion.

The contents disclosed in the aforementioned embodiment and modified example can be implemented by an appropriate combination thereof.

The vehicle management system according to the embodiment includes the imaging device provided in the shared vehicle to capture the passengers on the vehicle, the detection unit that detects that a user, who is one of the passengers, has performed a predetermined motion which is a motion registered in advance, based on a capturing result by the imaging device, and the controller that controls the vehicle based on a predetermined command, which is a command registered in advance as a command corresponding to the predetermined motion, when the predetermined motion is detected. In accordance with the vehicle management system according to the embodiment, the predetermined motion registered in advance is performed, so that it is possible to send a demand to the vehicle without being noticed by the other passengers.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle management system comprising:
an imaging device provided in a shared vehicle and configured to capture images of a plurality of passengers on the vehicle;
a detection unit configured to detect that a user, who is one of the plurality of passengers, has performed a predetermined motion which is a motion registered in advance by the user, based on a capturing result by the imaging device, wherein the predetermined motion is a mouth motion; and
a controller configured to:
control the vehicle based on a predetermined command, which is a command registered in advance by the user as a command corresponding to the predetermined motion,
verify the predetermined command by initiating individualized communication with the user by providing an individualized message to the user, and
control the vehicle to display a warning to at least one of the plurality of passengers in the vehicle, according to the predetermined command when the predetermined motion is detected and the predetermined command is verified by the user through the individualized communication.

2. The vehicle management system according to claim 1, wherein
the predetermined command additionally included a command for causing the vehicle to give an audio warning to another passenger, besides the user.

3. The vehicle management system according to claim 1, wherein
the predetermined command additionally includes a command for changing a drop-off point of the user.

4. The vehicle management system according to claim 3, wherein
the additionally included command in the predetermined command is a command for changing the drop-off point to a point associated with a location of a restroom.

* * * * *